Patented Jan. 9, 1940

2,186,756

UNITED STATES PATENT OFFICE 2,186,756

METHOD OF PRINTING ON ASPHALTIC COMPOSITIONS

John T. Hargrave, New York, N. Y., assignor to Interchemical Corporation, New York, N. Y., a corporation of Ohio No Drawing. Application October 5, 1937, Serial No. 167,386

5 Claims. (Cl. 91—67.9)

This invention relates to printing inks and the like, and has particular reference to printing and marking over bitumens. More particularly, it relates to a method of printing and marking over bitumens with an ink which would normally be discolored by bleeding of the bitumen, in which the marking is followed by immediate removal of the bleeding solvent from the ink by dilution of the ink with a solvent miscible with ink solvent, but immiscible with the binder so as to simultaneously precipitate the binder and pigment into the bitumen and remove the bleeding solvent.

The problem of marking over bitumens is immensely complicated by the fact that the bitumens are soluble in practically all solvents with the exception of water and the lower aliphatic alcohols, and are likewise soluble in the drying oils which are the normal binders of most present day marking compositions. As a result of such solubility, the bitumens "bleed" into most markings and discolor them generally in an uneven and blotchy manner, so that if a light color is used which contrasts with the normal black of the bitumen body, it normally is seriously discolored by such bleeding.

Attempts have been made to overcome this difficulty by using water-soluble markings, but these remain water-soluble and are therefore objectionable. A second suggestion has been the use of inks with vehicles comprising solutions of shellac and the like in one of the lower alcohols. These are difficult to print as they dry too rapidly for most types of printing. A third suggestion has been the use of flake metallic pigments in the ink; these float to the top and hide the discoloration of the vehicle. This solves the problem, but the colors obtainable are limited to the flake metallic pigments, which are often not desirable shades.

Other methods considered, and which have not been very successful, comprise sealing the asphalt before printing. These are generally far too expensive, since they entail sealing the entire surface for what is often only a limited marking; attempts to spot seal under the markings are generally unsuccessful because of difficulty of obtaining register.

I have discovered that, even if the marking of the bitumen be done with a solution of a binder in a solvent which causes bleeding of the asphalt, bleeding can be practically eliminated by removing the solvent just after the print is made, by diluting the solvent in the film with a solvent miscible with it but immiscible with the binder, whereby the binder is precipitated into the bitumen base with the pigment while the bleeding solvent is removed from the body of the print.

I prefer to use as the solvent for the binder a solvent which is substantially non-drying at ordinary room temperature (20–25° C.) in order to permit of the manufacture of press-stable inks. More volatile solvents can, of course, be used if desired.

The binder may be any which is a non-solvent for bitumens. The cellulose esters and ethers, plastic and solid natural and synthetic resins and waxes may all be used, while the binders may likewise contain oils which are non-solvent for bitumens. The normal pigments used in ordinary printing inks and marking compositions may be used.

Typical examples of inks which may be used according to my invention are as follows:

Example I

10¼ pounds Lithol Red
    are ground in
47½ pounds varnish
    made from
14    pounds dibutyl phthalate
2½ pounds glycol phthalate
1    pound wood rosin
10   pounds fatty acid modified glycerol phthalate resin (medium length)

This ink is printed on bitumen by an ordinary typographic press. The bitumen is then run through a bath of molten paraffin wax; the wax removes the dibutyl phthalate from the ink, being miscible therewith, and precipitates the binder, occluding the pigment onto the bitumen. The print dries on cooling, leaving a waxed, printed bitumen.

Example II 45 pounds titanium dioxide
    and
5 pounds aluminum hydrate
    are ground in a vehicle comprising
25 pounds rosin ester gum modified phenolic resin (Amberol F-7, made by Resinous Products & Chemical Co.)
25 pounds petroleum hydrocarbon solvent (boiling range—252 to 307° C.)

This ink was printed on asphaltic composition boards by an ordinary typographic press, and immediately passed through a bath of 91% isopropanol. After a few seconds immersion, the boards were withdrawn from the bath and the alcohol allowed to evaporate in the air. After a few seconds, a hard print was obtained which showed no evidences of bleeding.

Other inks than those shown above can be used to advantage in my process; and other precipitants can be employed, such as various waxes and water, provided the binder and the precipitant are immiscible and neither bleed asphalt.

While I prefer to pass the printed bitumen through a bath of solvent to obtain an instantaneous excess, I can obtain results by spraying solvent onto the prints or applying an excess in any known manner.

My new method, using water or alcohol, is particularly applicable to the decoration of battery boxes and similar objects now made from bituminous molding compositions. Precipitation with wax is particularly desirable where the finished object should be waxed, as in the preparation of electric wiring insulated with bituminous compositions such as stearin pitch and the like. In all instances, I am able to produce a new type of marking hitherto considered impossible on asphalt, in which the binder is insoluble in water and the lower water-soluble aliphatic alcohols.

Complete coatings can likewise be printed on bitumens by my method. Such coatings may likewise be applied by means other than printing, but in such cases the use of larger quantities of solvents than are used in printing, plus the time consumed in coating, may result in bleeding before the solvent can be removed. For these reasons, I prefer to coat by a printing or some analogous method whereby solvent and time consumed can be kept at a minimum.

What I claim is:

1. The method of marking a bituminous base which comprises applying a coating which is miscible with the bitumen, the coating comprising a binder which is a non-solvent for the bitumen, and a solvent which is a solvent for both the binder and the bitumen, and thereafter treating the base, before substantial mixing of the bitumen with the coating has occurred, with an excess of a second solvent which is miscible with the solvent of the coating and is a non-solvent for the bitumen and the binder of the coating, whereby the resultant mixture of first solvent and second solvent precipitates the binder without visible discoloration by the bitumen.

2. The method of printing a bituminous base which comprises applying an ink which is miscible with the bitumen, the ink comprising a binder which is a non-solvent for the bitumen, and a solvent which is a solvent for both the binder and the bitumen, and thereafter treating the base, before substantial mixing of the bitumen with the ink has occurred, with an excess of a second solvent which is miscible with the solvent of the ink and is a non-solvent for the bitumen and the binder of the ink, whereby the resultant mixture of first solvent and second solvent precipitates the binder without visible discoloration by the bitumen.

3. The method of claim 2, in which the bituminous base is passed through a bath of the second solvent.

4. The method of marking a bituminous base which comprises printing on the bitumen with an ink comprising pigment dispersed in a vehicle comprising a binder insoluble in paraffine wax and a solvent therefor miscible with paraffine wax and with the bitumen, and thereafter treating the bitumen, before substantial mixing of the bitumen with the ink has occurred, with an excess of molten paraffine wax, removing the major portion of the paraffine wax and the solvent mixed therein from proximity to the base, while leaving a thin film of wax on the surface, and allowing the wax to harden by cooling, to produce a waxed print not visibly discolored by the bitumen.

5. The method of marking a bituminous base which comprises printing on the bitumen with an ink comprising pigment dispersed in a vehicle comprising a binder insoluble in a lower water-soluble aliphatic alcohol and a solvent therefor miscible with a lower water-soluble aliphatic alcohol, and thereafter treating the bitumen, before substantial mixing of the bitumen with the ink has occurred, with an excess of water soluble lower aliphatic alcohol, and then removing the alcohol to produce a dry print not visibly discolored by the bitumen.

JOHN T. HARGRAVE.